United States Patent
Mano et al.

(10) Patent No.: US 8,115,968 B2
(45) Date of Patent: Feb. 14, 2012

(54) IMAGE PROCESSING APPARATUS, COMPUTER PROGRAM PRODUCT, AND PREVIEW IMAGE DISPLAYING METHOD

(75) Inventors: Hiroko Mano, Tokyo (JP); Tetsuya Sakayori, Tokyo (JP); Takashi Yano, Tokyo (JP); Junichi Takami, Kanagawa (JP); Iwao Saeki, Kanagawa (JP); Yoshifumi Sakuramata, Tokyo (JP); Takanori Nagahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1012 days.

(21) Appl. No.: 12/043,195

(22) Filed: Mar. 6, 2008

(65) Prior Publication Data
US 2008/0225346 A1    Sep. 18, 2008

(30) Foreign Application Priority Data
Mar. 14, 2007   (JP) .................. 2007-065694

(51) Int. Cl.
*H04N 1/40* (2006.01)
(52) U.S. Cl. .................. 358/448; 358/527; 358/462
(58) Field of Classification Search .................. 358/448, 358/527, 462
See application file for complete search history.

(56) References Cited

U.S. PATENT DOCUMENTS
2007/0127961 A1* 6/2007 Han et al. ............ 399/364
2009/0219580 A1* 9/2009 Cornell et al. ............ 358/474

FOREIGN PATENT DOCUMENTS
JP   2001-67347   3/2001
JP   2006-3568    1/2006

* cited by examiner

*Primary Examiner* — Twyler Haskins
*Assistant Examiner* — Michael Burleson
(74) *Attorney, Agent, or Firm* — Dickstein Shapiro LLP

(57) ABSTRACT

In an image processing apparatus, preview images are generating by continuously scanning both sides of originals. The page scrolling unit scrolls the preview images while pairing a first preview image to be processed with a second preview image that is not processed as pages of front and back sides of an original or a two-page spread, and a preview displaying unit displays at least one of the first preview image and the second image.

19 Claims, 15 Drawing Sheets

FIG. 4

| SETTING ITEMS | POSITION (UPPER LEFT, LOWER RIGHT COORDINATES) |
|---|---|
| STAPLE | (0, 0)　(40, 40) |
| | (120, 0)　(160, 40) |
| PUNCH | (0, 40)　(40, 270) |
| | (40, 0)　(200, 40) |
| ADJUST MARGIN | |

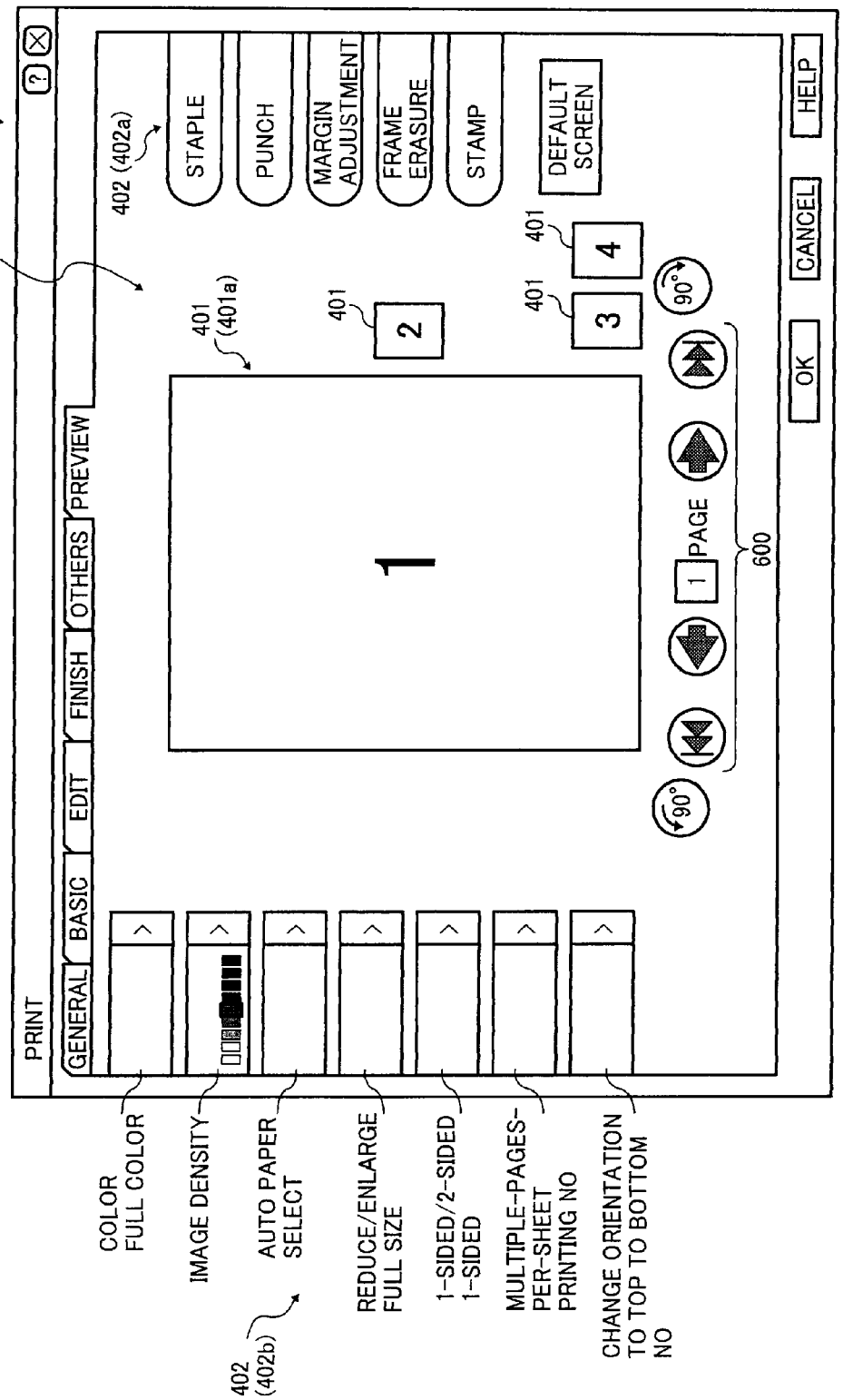

IMAGE PROCESSING APPARATUS, COMPUTER PROGRAM PRODUCT, AND PREVIEW IMAGE DISPLAYING METHOD

CROSS-REFERENCE TO RELATED APPLICATIONS

The present application claims priority to and incorporates by reference the entire contents of Japanese priority document 2007-065694 filed in Japan on Mar. 14, 2007.

BACKGROUND OF THE INVENTION

1. Field of the Invention

The present invention relates to an image processing apparatus, a computer program product, and a preview image displaying method.

2. Description of the Related Art

A multi-function product, which is a so-called multi-function peripheral (MFP), has recently become widely used. An MFP includes a scanning unit that scans an image of an original, a copying unit that prints out an image read by the scanning unit, a printing unit or a facsimile unit that prints out image data that has been input externally, or provided with functions of the foregoing units.

With such an MFP, a user can enter settings for various functions. These functions include: settings relating to conditions of an original, such as a type or density thereof; settings relating to various imaging processes, such as an enlargement/reduction ratio, one-sided or double-sided printing, or margin sizes; and settings relating to finishing processes, such as stamping, stapling, or punching.

However, even if the user specifies settings for these finishing functions, known MFPs do not allow the user to check how a resultant printout will be until the resultant printout is actually output. For example, if the user attempts to punch holes on the printout, the holes may end up being punched on an output image. However, because the user cannot check such an end result before executing the actual printing, the operation may result in a misprint, and the paper may be wasted.

Japanese Patent Application Laid-open No. 2001-67347 discloses an image processing apparatus developed in an attempt to solve this problem. The image processing apparatus displays a preview image of end results of various functions (such as a printing paper size, a printed side(s) thereof, punching, or stapling) provided using a pre-scanned image of an original before executing actual printing. This preview feature allows the user to check how the output result will be, and to change the settings if necessary.

The applicant of the present application has developed an intuitive and convenient user interface in Japanese Patent Application Laid-open No. 2006-003568. This interface enables the user to touch a specific area of the preview image of an original to cause a menu related to that area to be displayed, and to select functions related thereto (such as a printing paper, a printed side(s), punching, stapling, output color, output density, enlargement/reduction ratio, printing multiple pages per sheet, and sorting/stacking), and the selected settings are immediately reflected onto the preview image.

Upon printing images onto a plurality of printing paper sheets, the front side and the back side of the paper need to be distinguished because images printed thereon are interrelated to each other. However, it is difficult for the user to determine if the image displayed on a screen is a front side image or a back side image. In addition, upon binding a plurality of sheets, such as by stapling, the user needs to be able to check if each of the sheets is oriented correctly, and if a given page is in a correct position with respect to the page prior to or the page next to that page in question.

In addition, upon scanning and processing originals with images printed thereon, pages of the originals could be arranged out of order, unlike image data that is created on a computer and is arranged in order. For example, the front side images and the back side images may be mixed up; some pages may be oriented incorrectly; or some pages may be placed in an incorrect position with respect to the page prior to or next to the page in question. Therefore, it is important for the user to be able to check how an end result will be.

SUMMARY OF THE INVENTION

It is an object of the present invention to at least partially solve the problems in the conventional technology.

According to an aspect of the present invention, there is provided an image processing apparatus including a preview image generating unit that generates preview images by continuously scanning both sides of originals; a page scrolling unit that scrolls the preview images while pairing a first preview image to be processed according to a predetermined setting with a second preview image that is not processed as pages of any one of front and back sides of an original and a two-page spread; and a preview displaying unit that displays at least one of the first preview image and the second image.

According to another aspect of the present invention, there is provided a preview image displaying method including generating preview images by continuously scanning both sides of originals; scrolling the preview images while pairing a first preview image to be processed according to a predetermined setting with a second preview image that is not processed as pages of any one of front and back sides of an original and a two-page spread; and displaying at least one of the first preview image and the second image.

According to still another aspect of the present invention, there is provided a computer program product including a computer usable medium having computer readable program codes embodied in the medium that, when executed, causes an image processing apparatus to execute: the above preview image displaying method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table showing relation between a setting item and a settable area;

FIG. 8 is a schematic diagram of preview images having a detailed image and summary images, both of which are zoomed-in;

FIG. 20 is a schematic diagram of an exemplary display screen presented by a printer driver according to the sixth embodiment.

DETAILED DESCRIPTION OF THE PREFERRED EMBODIMENTS

Exemplary embodiments of the present invention are explained in detail below with reference to the accompanying drawings.

A first embodiment of the present invention is explained with reference to FIGS. 1 to 6. In the first embodiment, a multifunction peripheral (MFP), including functions such as coping, facsimile, printing, scanning, and distributing, is used as the image processing apparatus. The distributing function is a function that distributes an input image (such as an image of an original scanned by the scanning function, or an image input via the printing or the facsimile function).

Figure 1:
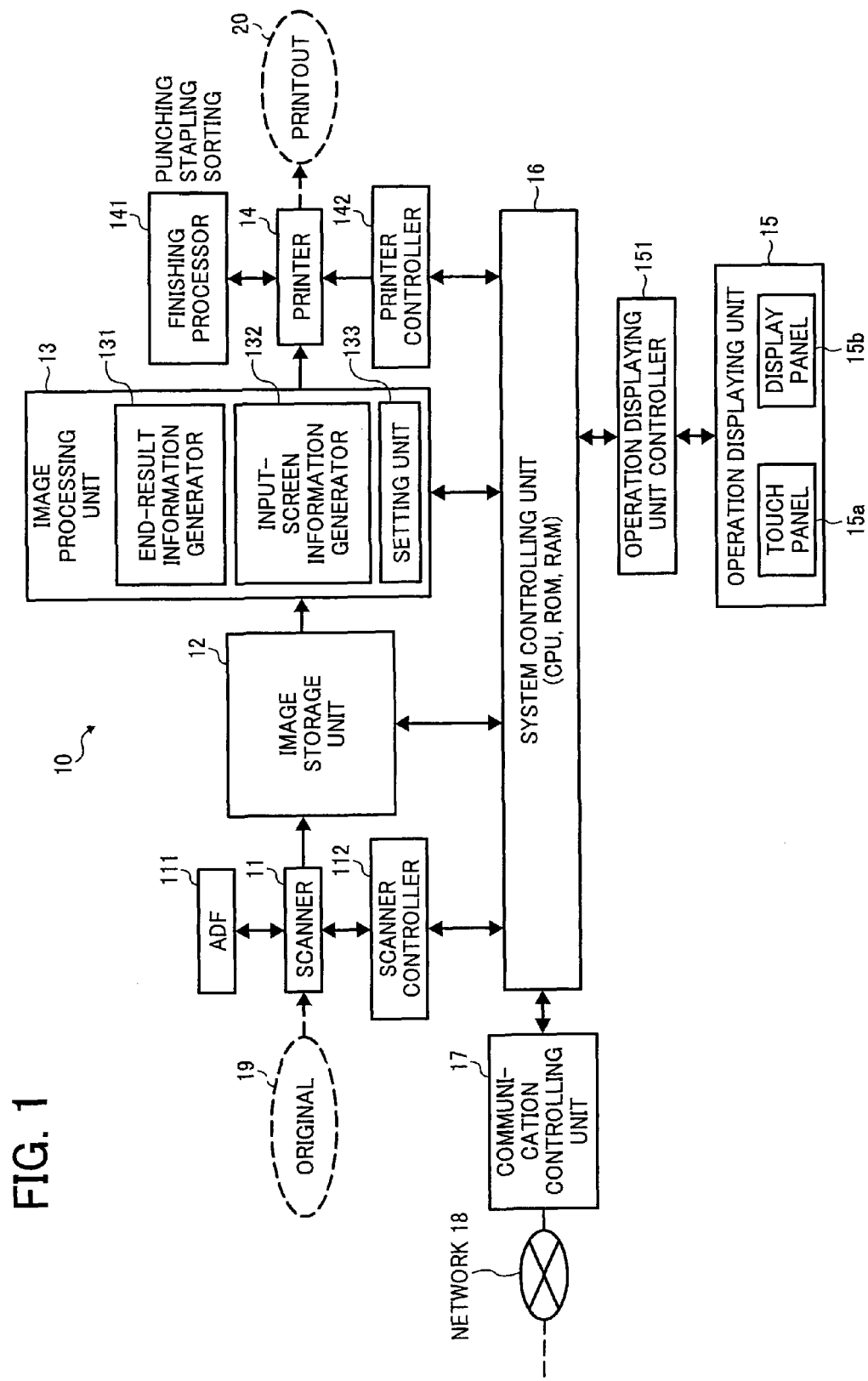
FIG. 1 is a functional block diagram of a MFP according to a first embodiment of the present invention.

FIG. 1 is a functional block diagram of an MFP 10 according to the first embodiment. The MFP 10 includes a scanner 11, an auto document feeder (ADF) 111, a scanner controller 112, an image storage unit 12, an image processing unit 13, a printer 14, a printer controller 142, a finishing processor 141, an operation displaying unit 15, an operation displaying unit controller 151, a system controlling unit 16, and a communication controlling unit 17. The MFP 10 is connected to a network 18 via the communication controlling unit 17. The MFP 10 scans an image of an original 19, performs imaging processes thereto, and outputs the image as a printout 20.

The system controlling unit 16 is connected to each of the above-described components, and controls the entire MFP 10. One example of the controls performed by the system controlling unit 16 is to provide the scanner 11 with information indicative of a scanning area suitable for a selected paper size. The system controlling unit 16 includes a central processing unit (CPU), a read-only memory (ROM), and a random access memory (RAM), each of which is not shown. The CPU operates according to computer programs that are stored in the ROM, using a working area in the RAM, to execute various functions.

The computer programs executed in the MFP 10 can be stored in a computer-readable storage medium, such as a compact disc-read only memory (CD-ROM), a flexible disk (FD), a compact disc-recordable (CD-R), or a digital versatile disk (DVD) as files in an installable or an executable format. If the computer programs are stored in such a storage medium, the CPU in the system controlling unit 16 reads and loads the computer programs from the storage medium onto a main storage device (not shown), to realize the various functions of the MFP 10. The computer programs can be stored in another computer connected to the network 18, such as an Internet, and downloaded over the network 18. Alternatively, the computer programs can be provided or distributed via a network, such as the Internet.

The communication controlling unit 17 is connected to the network 18, such as a local area network (LAN) or the Internet, and exchanges image data and control data with other apparatus connected to the network, following communication protocols.

The scanner controller 112 receives instructions from the system controlling unit 16 to control the scanner 11. The scanner 11 is controlled by the scanner controller 112 to convert an image of the original 19 to digital image data. The ADF 111 can feed a plurality of originals to a scanning position of the scanner 11 one by one, so that the scanner 11 can automatically scan the originals continuously. The ADF 111 can reverse both an original with an image printed on one side and an original with images printed on both sides, and send them to the scanner 11. Therefore, the scanner 11 can scan images printed on both sides of an original.

The image storage unit 12 is a buffer memory that receives an instruction from the system controlling unit 16 to temporarily store therein image data scanned by the scanner 11, image data externally input via the network 18, or the like. The MFP 10 is capable of processing and providing an image forming process to either the image data scanned by the scanner 11, or the image data that is externally input, for example, via the network 18.

The image processing unit 13 receives an instruction from the system controlling unit 16 to provide a γ correction, a modulation transfer function (MTF) correction, or the like, and then to provide gradation processes, such as slicing or dithering to binarize (or multi-value) multi-valued data sent from the scanner 11 and stored temporarily in the image storage unit 12. In addition to the above, the image processing unit 13 performs various image processes (such as enlargement/reduction of an image, adjustment of density/colors of an image) for the functions set by a user. Furthermore, the image processing unit 13 performs an image area editing process (such as removing, moving, and reversing an image area), a layout process (such as double-sided/single-sided printing, multiple-pages-per-sheet printing, and margin adjustment), and an end-result information generating process for generating a preview image of the resultant printout.

The image processing unit 13 includes an end-result information generator 131, an input-screen information generator 132, and a setting unit 133. The end-result information generator 131 basically functions to generate the end result information (preview images) to be displayed on a display panel 15b. The end result information is generated by providing various processes and settings to the image data of a pre-scanned original, based on the various settings input for that image data. The end-result information generator 131 uses the multi-valued data temporarily stored in the image storage unit 12. The input-screen information generator 132 generates information about an input screen to be displayed on the display panel 15b. The information includes setting items for receiving therethrough various settings relating to the end result information generated by the end-result information generator 131.

If a user enters settings via an input screen 400 that is displayed on the display panel 15b, using a touch panel 15a, the setting unit 133 not only receives the input signals, but also obtains coordinate information in the input image stored in the image storage unit 12.

When the setting unit 133 receives the input setting signals, the end-result information generator 131 generates updated end result information again based on the input setting signals received by the setting unit 133, and an expected end result image, updated by the updated end result information, is displayed on the display panel 15b.

The input-screen information generator 132 generates input screen information for generating a screen for receiving settings input by the user, again, based on the input setting signals received by the setting unit 133. The input screen 400 is then updated based on the input screen information generated by the input-screen information generator 132, and displayed on the display panel 15b.

The printer controller 142 receives an instruction from the system controlling unit 16 to control the printer 14. The printer 14 includes the finishing processor 141. The finishing processor 141 receives automatic settings or settings by the user to perform finishing processes such as sorting, stamping, stapling, or punching. Sorting is a process to sort the printouts 20 into sets or units of pages after printing is completed. Stamping is a process to provide a given stamp to a printed medium. Stapling is a process to align a plurality of printed media and to staple together. Punching is a process to punch holes so that the printed media can be filed in a binder or a file.

The operation displaying unit controller 151 functions as a displaying unit, and controls inputs and outputs to/from the operation displaying unit 15 in response to the instructions received from the system controlling unit 16. For example, the operation displaying unit controller 151 controls to output data processed in the image processing unit 13 therefrom to the touch panel 15a and the display panel 15b that are provided to the operation displaying unit 15. More specifically, the operation displaying unit controller 151 causes the generated end result information (preview image) to be displayed on the display panel 15b, and controls inputs entered by the user via the touch panel 15a. The display panel 15b and the touch panel 15a are shown to be separate units in FIG. 1. However, they are integrated in the first embodiment.

The touch panel 15a electrically or magnetically detects a position of a pointer in contact therewith. A human finger, a stylus pen, and other contact-type input instruments (hereinafter, "pointer") can be used as a pointing unit (not shown) for the touch panel 15a. The user enters various settings, including those for the printing, by touching the touch panel 15a using one of these pointers.

In the first embodiment, the settings are explained to be input by the user touching the touch panel 15a, however, it is not limited to such an inputting method. For example, in addition to the touch panel 15a, the operation displaying unit 15 can include hardware keys to allow the user to input the settings by pushing the physical keys to provide instructions, such as a print instruction. Moreover, the MFP 10 can include the display panel 15b as a dedicated displaying unit.

Under the control of the operation displaying unit controller 151, the operation displaying unit 15 receives the settings input by the user via the touch panel 15a, and displays the end result information (preview image) or menu items in a setting area for setting finishing processes on the display panel 15b as a displaying unit.

The operation displaying unit 15 displays functions that the user wishes to execute with the MFP 10 as menu items in the setting screen. The user can enter settings through these menu items, and the operation displaying unit 15 receives the settings entered by the user. When the user touches the touch panel 15a with a pointer in a section where a menu item can be selected, the operation displaying unit controller 151 detects coordinates of the touched point. If the operation displaying unit controller 151 detects that the touched point is within an area where a given menu item can be selected, then the operation displaying unit controller 151 assumes that the menu item has been selected, and accepts the input for the menu item. The operation displaying unit 15 receives settings, such as: condition settings for scanning a specific original with the scanner 11; settings for the image processing unit 13 for performing processes such as image quality adjustment of the scanned image data; printing condition settings for the printer 14; or settings for the finishing processor 141 for performing finishing processes such as sorting, stapling, or punching, to the printouts after printing is completed.

The system controlling unit 16 receives various settings such as those described above via the operation displaying unit controller 151, and causes the image processing unit 13 to process the original image data that is stored in the image storage unit 12 based on the specified settings, and to generate end result information (preview image). The end result information (preview image) is sent to the operation displaying unit 15, and displayed on the display panel 15b.

Figure 2:
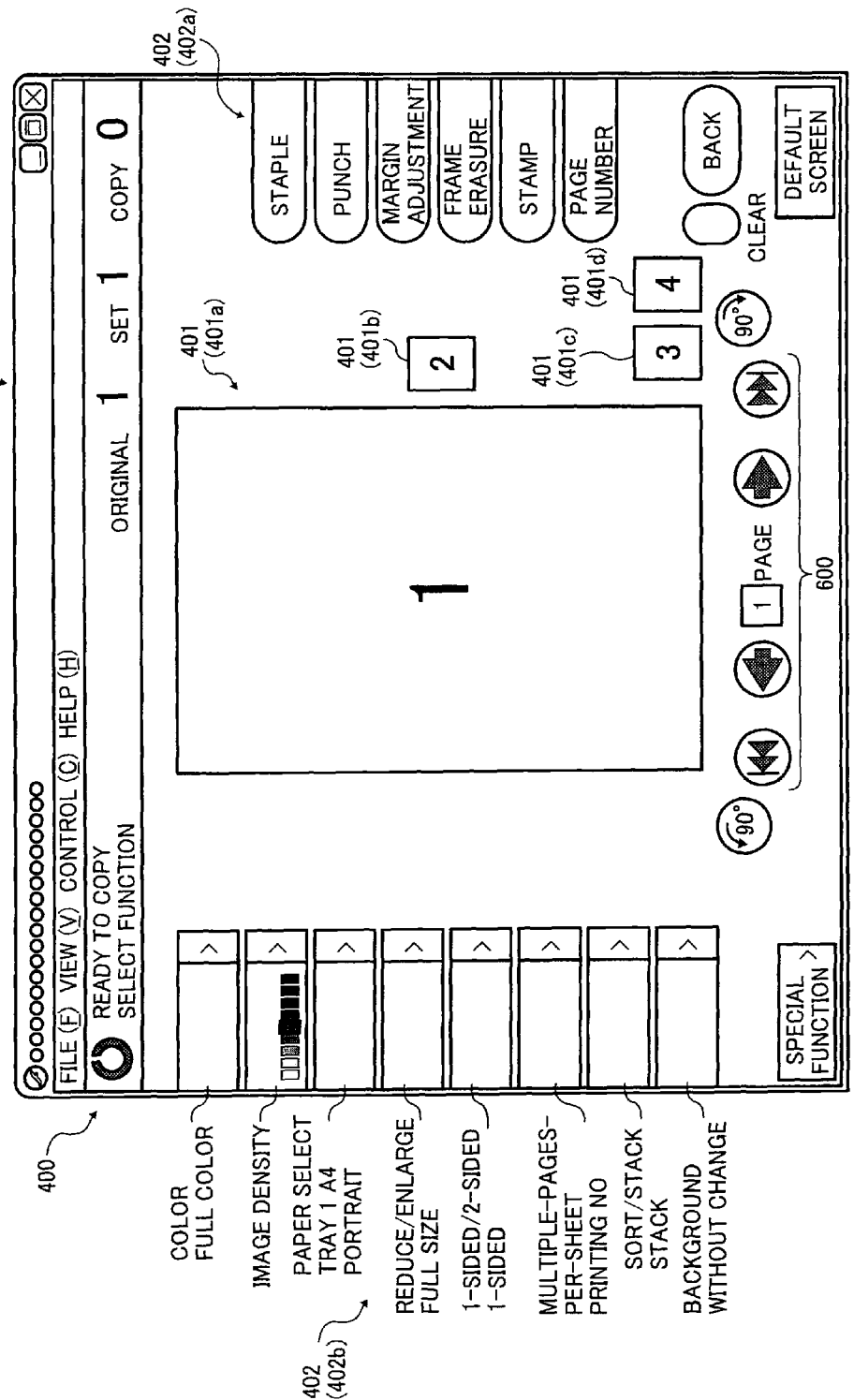
FIG. 2 is a schematic diagram of an example of end result information (preview image)

FIG. 2 is a schematic diagram of an example of end result information (preview image) generated when image data is input to the MFP 10. FIG. 2 is an example of displayed end result information obtained by continuously scanning both sides of the originals by the scanner 11. End result information (preview image) 401 and setting menu items 402 are displayed on the display panel 15b in the operation displaying unit 15. Page-forward and page-back buttons 600 enable the user to scroll the pages in a back and forward direction.

In this example, as mentioned above, both sides of the originals are scanned by the scanner 11. Therefore, the input screen 400, displayed on the display panel 15b, includes a plurality of end result information (preview images) 401, and the images are arranged in the order scanned by the scanner 11. The user can input various settings to end result information (preview image) 401a among the end result information (preview images) 401. The end result information (preview image) 401a is enlarged in size and is called a "detailed image". Other secondary end result information (preview images) 401, except for the end result information (preview image) 401a, are called "summary images". In FIG. 2, the end result information (preview image) 401a shows an image of the front side of a first sheet (the first page); the end result information (preview image) 401b shows an image of the back side of the first sheet (the second page); the end result information (preview image) 401c shows an image of the front side of a second sheet (the third page); and the end result information (preview image) 401d shows an image of the back side of the second sheet (the fourth page). In this manner, a preview displaying unit is realized.

According to the first embodiment, the detailed image is positioned adjacent to one of the summary images to form a pair, at an approximate center of the input screen 400. Nearby this pair, the remaining pair of the summary images is arranged. In FIG. 2, which is showing an initial state of the input screen 400, a pair of summary images is shown only at the right side at the center. However, the pair of summary images can be also displayed at the left upon the user scrolling the pages.

The setting menu items 402 include those for a menu 402a and a menu 402b. The menu 402a is displayed on the right side of the screen, and includes position-dependent setting menu items that are dependent on positions in the end result information (preview image) 401. Examples of the position-dependent setting menu items include finishing processes, such as stapling, punching, adjusting binding margins, erasing a frame, stamping, or assigning page numbers. The menu 402b is displayed on the left side of the display, and includes setting menu items that are not dependent on content, such as output color, output density, paper size, enlargement/reduction ratio, double-sided/single-sided printing, multiple-pages-per-sheet printing, sorting/stacking, or background.

The user touches the touch panel 15a with the pointer while looking at the end result information (preview image) 401 displayed on the display panel 15b. The touch panel 15a accepts the touch made by the pointer as an input of position information, which is a spatial position of the resultant print-out on the end result information (preview image) 401. The setting unit 133 analyzes the position information accepted by the touch panel 15a, and obtains coordinate information of the position that the pointer touched on the image.

With such structure, the MFP 10 can display the end result information (preview image) 401 on the display panel 15b provided to the operation displaying unit 15 of the MFP 10 before actually printing a copy. Therefore, the user can visually check the end result information (preview image) and change the settings, if necessary, before executing the actual printing.

Figure 3:
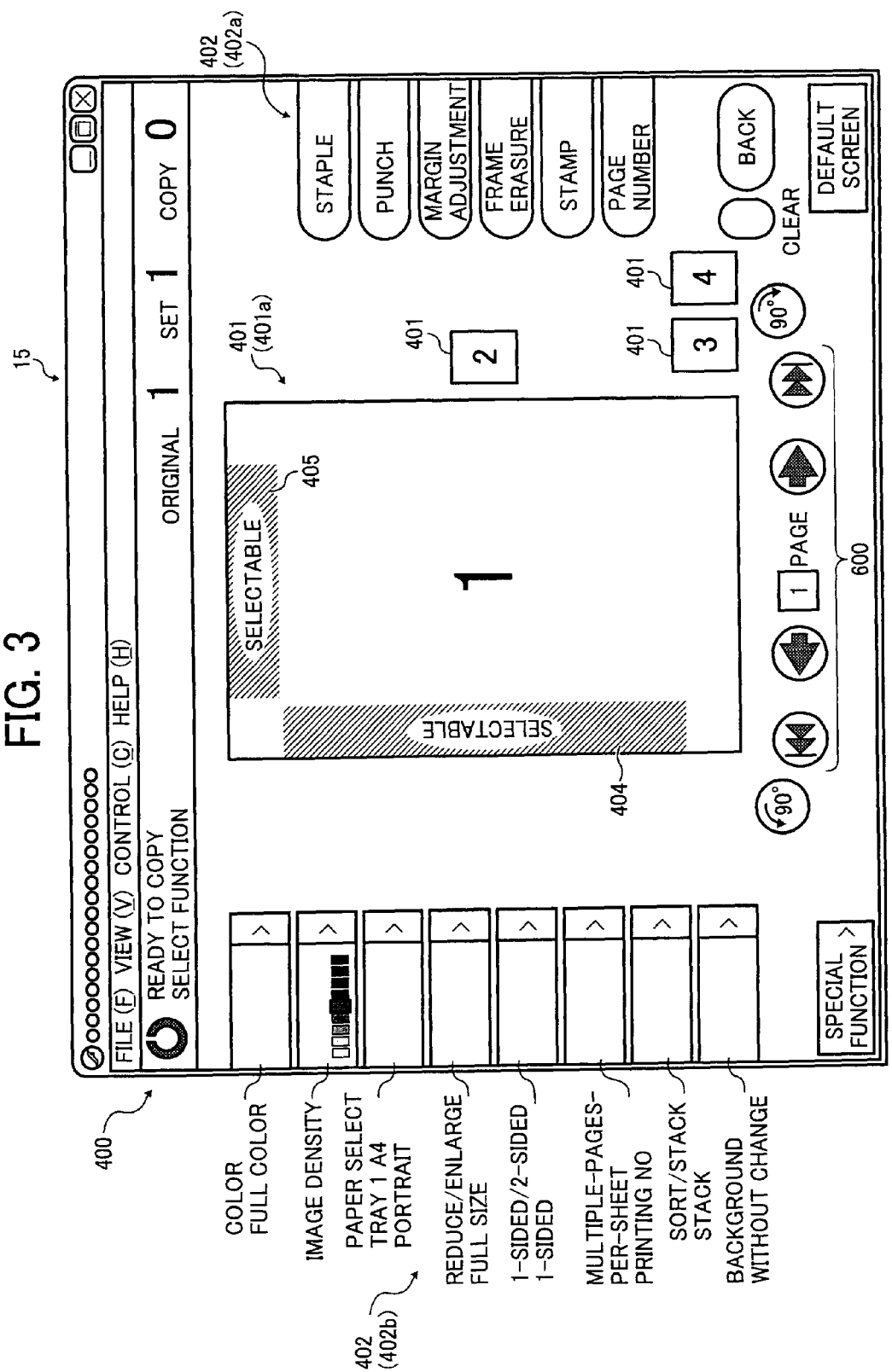
FIG. 3 is a schematic diagram of the example end result information shown in FIG. 2 after a setting menu item has been selected.

As shown in FIG. 3, it is assumed that the user selects a punching operation 403 from the setting menu items 402 (402a), displayed on the operation displaying unit 15, by touching it.

The operation displaying unit 15 detects the input for the punching operation 403, and the system controlling unit 16 accepts the setting of the punching operation 403 via the operation displaying unit controller 151. The input-screen information generator 132 in the image processing unit 13 obtains settable areas 404 and 405, corresponding to the "punching", from a table shown in FIG. 4 in which each of the setting menu items 402 and its settable positions are associated with each other, and displays the settable areas 404 and 405 on the operation displaying unit 15. The settable areas 404 and 405, where the holes can be punched, can be displayed in the end result information (preview image) 401 in any manner. For example, the settable areas 404 and 405 can be displayed so that they are superposed on the end result information 401 or they are overwritten on the end result information 401. Alternatively, the settable areas 404 and 405 can be provided with a color different from that of the end result information 401, blinked, or the area except the settable areas 404 and 405 can be darkened. The settable positions in the table shown in FIG. 4 are defined as two coordinate points defining a diagonal. The diagonal connecting these two coordinate points defines a rectangle having one side parallel to a main scanning direction and the other side parallel to a sub-scanning direction. For example, the settable areas for the "stapling" operation are defined by coordinates (0, 0) and (40, 40), and (120, 0) and (160, 40).

Figure 5:
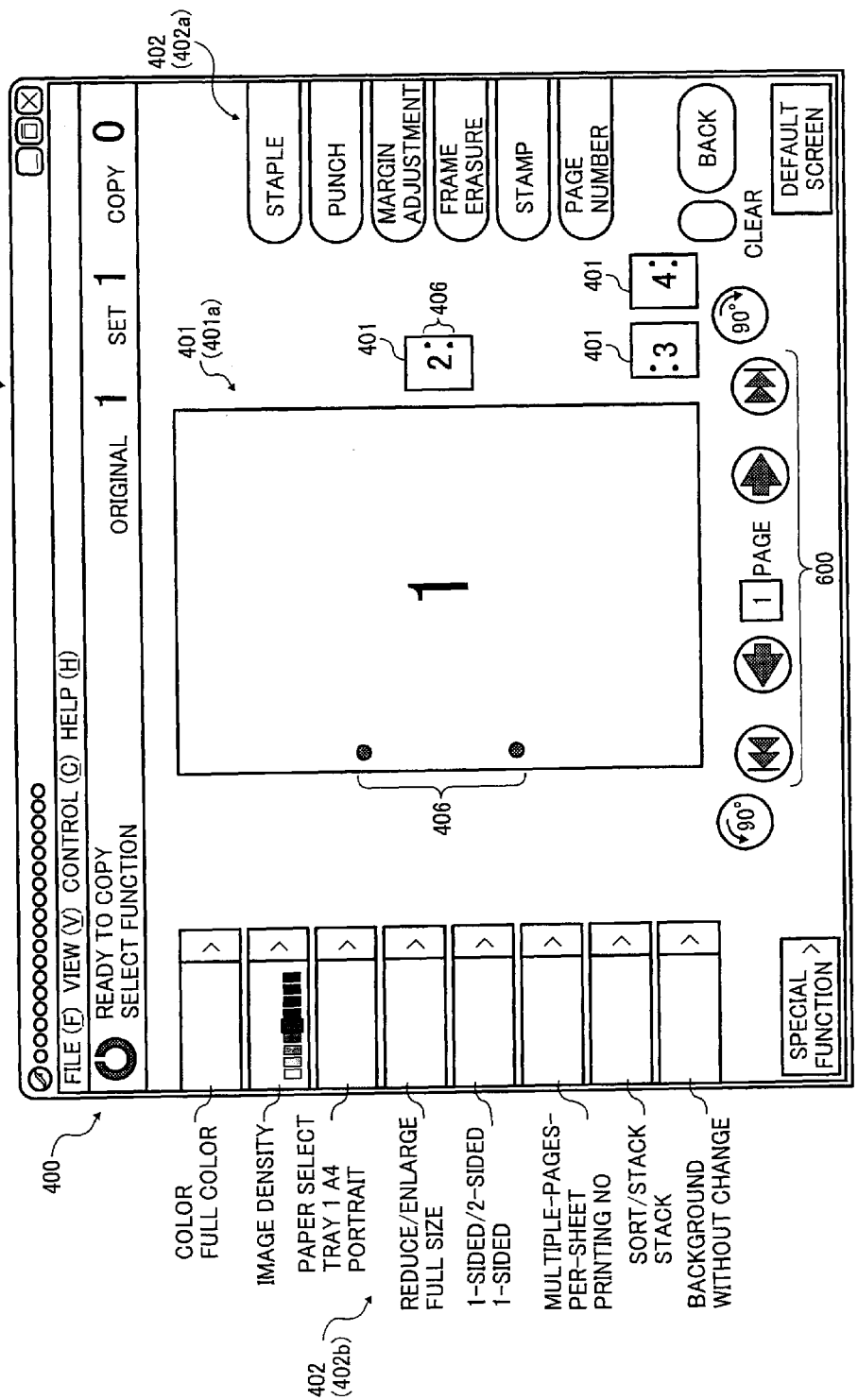
FIG. 5 is a schematic diagram of an example of the end result information shown in FIG. 3 with holes punched.

The user selects and touches the settable area 404 as shown in FIG. 3 with the pointer. When the operation displaying unit 15 accepts the input by way of the pointer touching the settable area 404 for the punching operation 403, the end-result information generator 131 in the image processing unit 13 generates end result information (preview image) with holes punched in the accepted area, and sends the information to the operation displaying unit 15. In response, the information is displayed on the operation displaying unit 15. FIG. 5 is a schematic diagram of the end result information (preview image) 401 with holes 406 punched. The end result information (preview image) 401, displayed in the process described above, can accept further inputs for settings, for example, to make corrections. The accepted settings are reflected to the end result information (preview image) 401 again, and displayed on the operation displaying unit 15. If no further setting inputs are accepted, a print instruction is accepted.

In FIG. 5, the end result information (preview images) 401 are shown to be punched with the holes 406. The end result information (preview image) 401 of the first page has the holes on the left side, and the end result information (preview image) 401 of the second page has the holes on the right side. In other words, according to the first embodiment, a processed position or area, or a position where a given process is affected, can be displayed on both pages of front and back sides of an original, or of a two-page spread, at areas associated with that given process. In addition, as shown in FIG. 5, if the processes are those whose processed position changes depending on whether the page is a front side or a back side of an original, or a right page or a left page of a two-page spread, the processed position can be changed depending on whether the page selected for operation is on the front side or the back side. Example of such a process, for which the processed position changes depending on whether the page is on the front side or the back side, include settings for binding (stapling or punching), margins, and those for moving or deleting an image. In this manner, a process setting position changing unit is realized.

When a user selects a function that leads to different results depending on which side of an original the process is provided to, a message can be provided in a pop-up window, a dialogue, or a description section, prompting the user to distinguish the sides of the page or to check the settings for the selected function. Furthermore, not only prompting the user, but the settable information can be also displayed for the function whose processed position changes depending on which side of an original the process is provided to. For example, it is assumed herein that the user touched the upper end of the end result information (preview image) 401 (401a) when a back side is being displayed. It is acceptable to provide staples to the specified position if the displayed page were a front side. However, it is not acceptable to provide staples to the specified position on a back side. Therefore, other functions that are acceptable to provide at the upper end of the back side can be displayed, as well as a dialogue saying "the current image is a back side". In addition, the stapling menu can be provided at the bottom end of the end result information (preview image) 401 (401a). It is also effective to prompt the user, for example using a dialogue, for a function, such as margin settings, whose settings affect the settings of the other side. In this manner, a notifying unit is realized.

The configuration can be such that when the user touches a specific area (not shown) in the preview image, menu items relating to the area is displayed. When the user selects one of the menu items, the selection can be immediately reflected to the preview image.

A preview image scrolling process, which is a characterizing process performed by the CPU in the system controlling unit 16 executing the computer programs stored in the ROM is explained.

As shown in FIG. 2, at an initial state, a detailed image is positioned adjacent to a summary image to form a pair, at the approximate center of the input screen 400. Nearby this pair, another pair of the summary images is arranged.

At this initial state, if the user operates any of the page-forward and page-back buttons 600, the operation displaying unit 15 detects the input to the page-forward and page-back buttons 600 by way of the user touching thereto. Via the operation displaying unit controller 151, the system controlling unit 16 receives the operation of the page-forward and page-back buttons 600. Upon receiving the operation performed by the page-forward and page-back buttons 600, the system controlling unit 16 controls the input-screen information generator 132 in the image processing unit 13, and causes the input-screen information generator 132 to generate the input screen 400 having the end result information (preview images) 401 with a page scrolled in a forward or backward direction. The resultant input screen 400 is then displayed on the operation displaying unit 15 via the operation displaying unit controller 151.

Figure 6A:
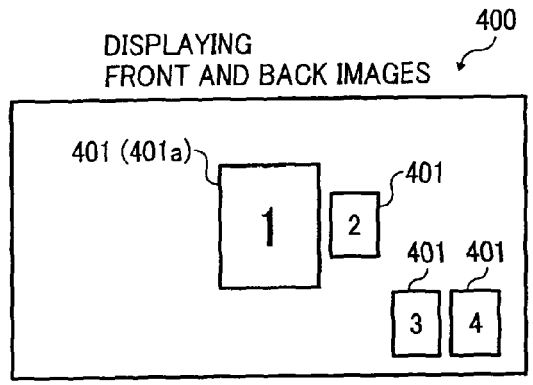
FIGS. 6A to 6C are schematic diagrams for explaining an exemplary preview image scrolling method according to the first embodiment.
Figure 6B:
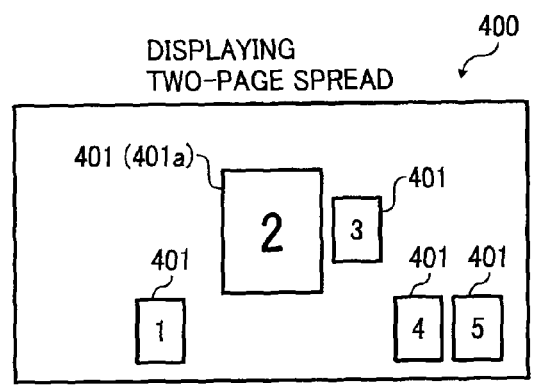
Figure 6C:
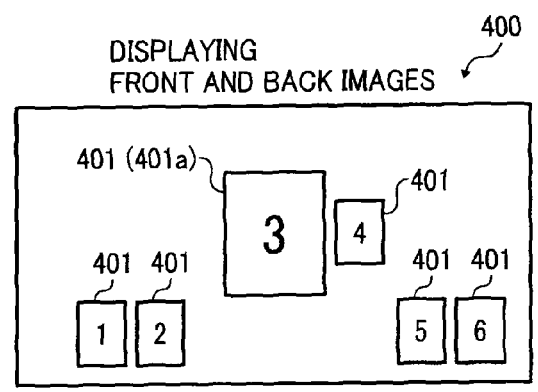

One example of a method for generating the input screen 400 in the input-screen information generator 132 is explained. The input screen 400 includes the end result information (preview images) 401 with a page scrolled in a forward or backward direction. FIGS. 6A to 6C are schematic diagrams for explaining an exemplary preview image scrolling method. When the user operates the page-forward and page-back buttons 600 and the system controlling unit 16 accepts a page-forward operation for scrolling one page at a time, the input-screen information generator 132 generates the input screen 400 having end result information (preview images) 401 with one page scrolled forward at a time in the detailed image 401a, as shown in FIGS. 6A to 6C. In other words, every time the user scrolls one page at a time while the double-sided printing is selected in the manner described in the first embodiment, images of front and back side of an original (FIGS. 6A and 6C) and those of a two-page spread (FIG. 6B) are alternately displayed as a pair of a detailed image and a summary image. In this manner, a page scrolling unit is realized.

As described above, according to the first embodiment, upon performing a double-sided printing, images of the front and the back sides of an original, or images on the two-page spread can be paired as a detailed image and a summary image, and at least one of the paired images to be processed can be displayed. Therefore, the user can easily imagine how the end result will be, including pages of the front and back sides of an original and pages on the two-page spread. In addition, because only one page is enlarged as a detailed image within a limited space in the display, the detailed image helps the user to understand the page layout easily. Therefore, the user can easily check how the end result will be with the double-sided printing within a limited space in the display, as well as which side of the original is to be bounded together.

Figure 7A:
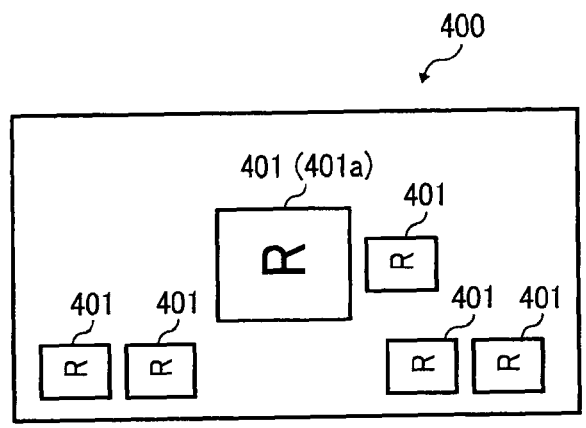
FIGS. 7A and 7B are schematic diagrams of preview images displayed as two-page spreads with the shorter sides of the preview images used as an axis.
Figure 7B:
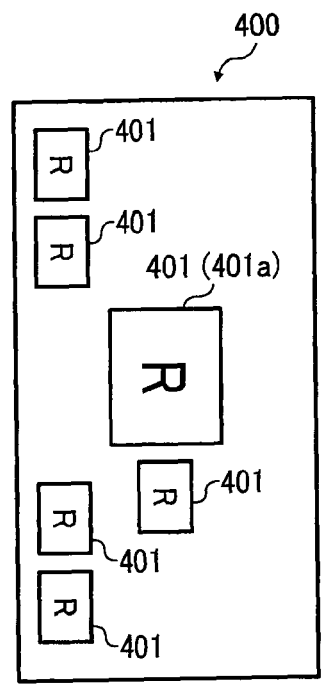

As to which side of the original image is to be used as an axis of two-page spread, the user makes a decision whether the shorter side or the longer side thereof should be used. According to the first embodiment, it is explained that the user specifies the longer side of the original image as the axis. If the user selects the shorter side of the original image as the axis of the two-page spread while the display panel 15b of the operation displaying unit 15 is long in the horizontal direction, it is difficult to display such end result information (preview images) 401 within the display panel 15b in the same direction as shown in FIG. 2. More specifically, if the end result information (preview images) 401 are to be arranged in the vertical direction (the two pages are to be spread out vertically) on the display panel 15b in the same direction as shown in FIG. 2, it is necessary to reduce the size of the end result information (preview images) 401 greatly. Therefore, according to the first embodiment, as shown in FIGS. 7A and 7B, if the user specifies the shorter side of the original image as the axis of the two-page spread, the end result information (preview images) 401 are rotated, upon being displayed, by 90 degrees with respect to the image having the axis of the two-page spread on the longer side thereof. In FIG. 7A, the display panel 15b of the operation displaying unit 15 is used as a horizontally-long panel. In FIG. 7B, the display panel 15b of the operation displaying unit 15 is used as a vertically-long panel. Therefore, the display panel 15b can easily display a two-page spread image having an axis on the shorter side of the original image. In this manner, a rotation unit is realized. If the user selects the shorter side of the preview image to be the axis of the two-page spread, the rotation unit rotates the preview image by 90 degrees with respect to a two-page spread image having its axis on the longer side of the preview image.

According to the first embodiment, the summary image paired with the detailed image is displayed reduced in size. However, a displaying method of the summary image is not limited to the above, and the summary image can also be displayed as a symbol or an icon (hereinafter, "symbol image"). If the summary image is displayed as a symbol image, it is possible to omit the process for reducing the image size, making a processing time faster. In addition, by providing a plurality of symbol images, the user can easily scroll to a page away from a currently-selected page. The symbol image representing the page prior to or next to the current page can also be shown in different colors, each color corresponding to the front side and the back side, respectively, facilitating the user to scroll through pages of the same side.

According to the first embodiment, a detailed image and a summary image that are pages of the front side and the back side of an original or pages of a two-page spread, are displayed adjacently as a pair. However, a displaying method of these images is not limited to the above. For example, alternatives below are also possible.

Figure 8:
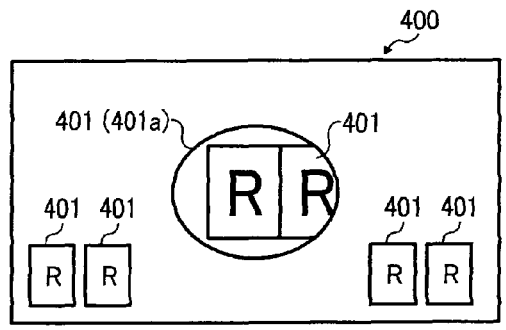
Figure 9:
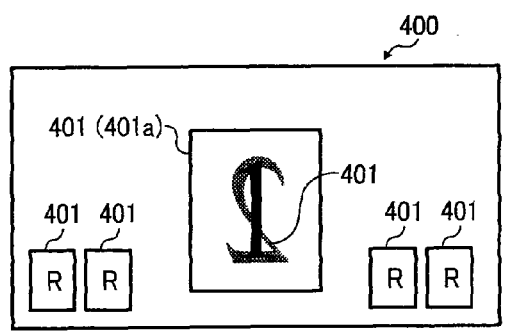
FIG. 9 is a schematic diagram of preview images where a summary image is displayed transparently with respect to a detailed image.
Figure 10:
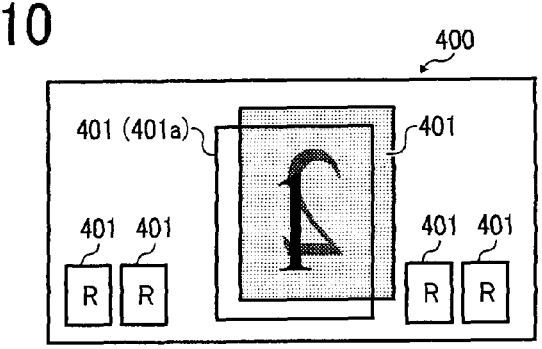
FIG. 10 is a schematic diagram of preview images where a summary image is displayed as a mirrored image with respect to a detailed image.
Figure 11:
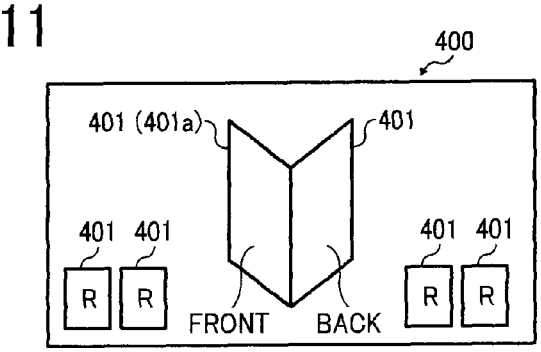
FIG. 11 is a schematic diagram of preview images where a summary image is displayed adjacent to a detailed image to form a shape like a folding screen.

To begin with, if a pair of the pages is the front side and the back side of an original, or makes up a two-page spread, a zoom-in images of the detailed image and the summary image can be provided, as shown in FIG. 8. At this time, the detailed image is shown in its entirety, and the summary image shown only partly. Then, if a pair of the pages is the front side and the back side of an original, the summary image can be displayed transparently with respect to the detailed image, as shown in FIG. 9. Then, if a pair of the pages is the front side and the back side of an original, the summary image can be displayed as a mirrored image with respect to the detailed image, as shown in FIG. 10. Then, if a pair of the pages is the front side and the back side of an original, or makes up a two-page spread, the summary image can be arranged adjacent to the detailed image in a shape like a folding screen, as shown in FIG. 11.

A second embodiment of the present invention is explained with reference to FIGS. 12A to 12C. The same components as in the first embodiment are provided with the same reference numbers, and the explanations thereof are omitted herein. In the second embodiment, another preview image scrolling method is proposed, in addition to that in the first embodiment.

Figure 12A:
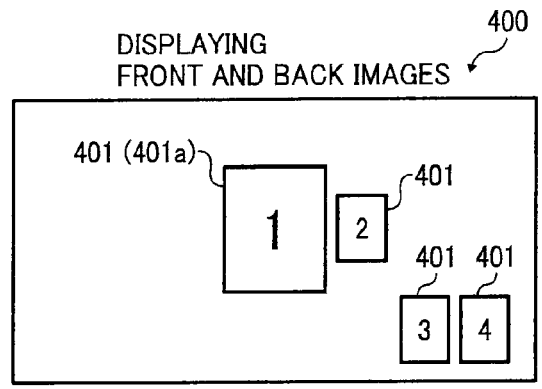
FIGS. 12A to 12C are schematic diagrams for explaining an exemplary preview image scrolling method according to a second embodiment of the present invention.
Figure 12B:
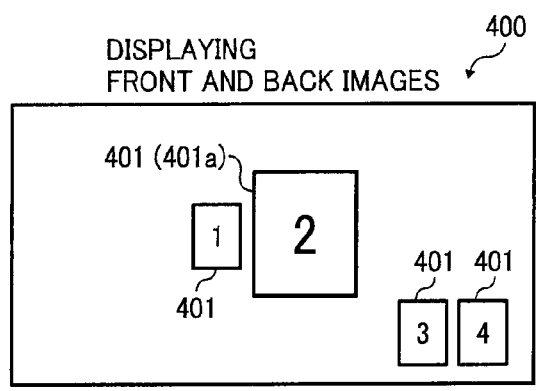
Figure 12C:
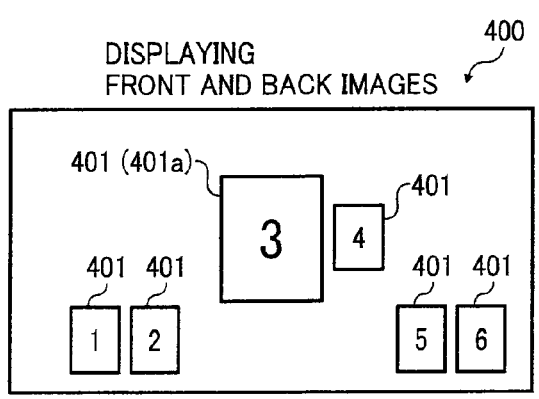

FIGS. 12A to 12C are schematic diagrams for explaining an exemplary preview image scrolling method according to the second embodiment. When the user operates the page-forward and page-back buttons 600 and the system controlling unit 16 accepts the page-forward operation to scroll one page at a time, the input-screen information generator 132 generates the input screen 400 having end result information (preview image) 401 with one page scrolled forward at a time in the detailed image 401a, as shown in FIGS. 12A to 12C. The second embodiment is different from the first different in that the pairs of summary images, representing the front side and the back side of an original, are always scrolled together in pairs near the detailed image 401a. In other words, if one page is scrolled at a time according to the second embodiment while a double-sided printing is selected, the pages are scrolled in pairs, each representing the front side and the back side of an original. More specifically, to begin with, the front side of the first sheet (the first page) is displayed as a detailed image, and the back side of the first sheet (the second page) is displayed as a summary image, as shown in FIG. 12A. When the page is scrolled, the front side of the first sheet (the first page) is displayed as a summary image, and the back side of the first sheet (the second page) is displayed as a detailed image, as shown in FIG. 12B. When the page is scrolled further, the front side of the second sheet (the third page) is displayed as a detailed image, and the back side of the second sheet (the forth page) is displayed as a summary image, as shown in FIG. 12C.

As described above, according to the second embodiment, when a double-sided printing is specified, the pairs of pages, each corresponding to the front side and the back side of an original, are displayed as pairs of the detailed image and the summary image within a limited space on the display screen. This displaying method does not only facilitate the user to imagine how the end result will be, but also enables the user to check contents of an enlarged page more easily, because each page in the page pair is enlarged as the detailed image. In this manner, the user can check how the end result will be with double-sided printing.

A third embodiment of the present invention is explained with reference to FIGS. 13A to 13C. The same components as in the first embodiment are provided with the same reference numbers, and the explanations thereof are omitted herein. In the third embodiment, another preview image scrolling method is proposed for the preview image, in addition to that in the first embodiment.

Figure 13A:
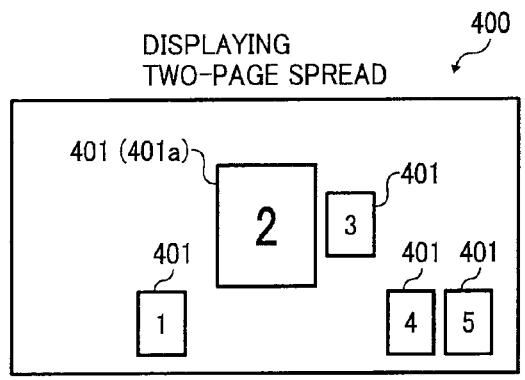
FIGS. 13A to 13C are schematic diagrams for explaining an exemplary preview image scrolling method according to a third embodiment of the present invention.
Figure 13B:
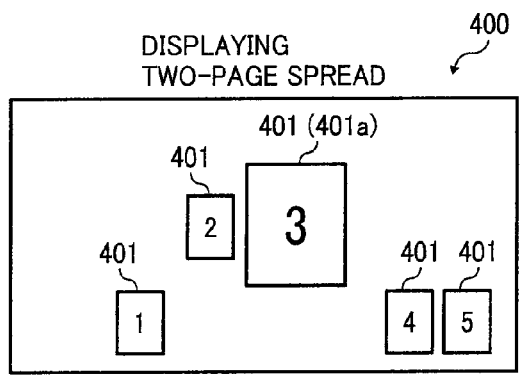
Figure 13C:
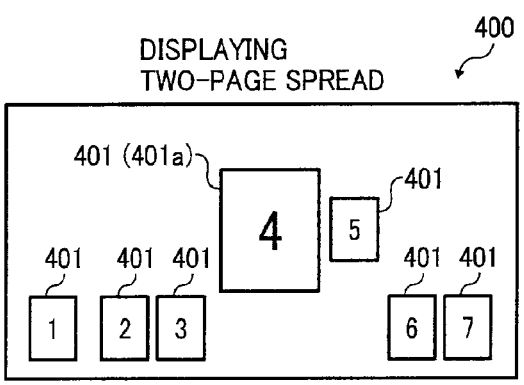

FIGS. 13A to 13C are schematic diagrams for explaining an exemplary preview image scrolling method according to the third embodiment. When the user operates the page-forward and page-back buttons 600 and the system controlling unit 16 accepts the page scrolling operation to scroll one page at a time, the input-screen information generator 132 generates the input screen 400 having the end result information (preview images) 401 with one page scrolled forward at a time in the detailed image 401a, as shown in FIGS. 13A to 13C. The third embodiment is different from the first embodiment in that pairs of summary images, representing a two-page spread of the original, are always scrolled together in pairs near the detailed image 401a. In other words, if the pages are scrolled one page at a time according to the third embodiment while double-sided printing is selected, the pages are scrolled in pairs, each representing a two-page spread. More specifically, to begin with, the front side of the first sheet (the first page) is displayed as a summary image, the back side of the first sheet (the second page) is displayed as a detailed image, and the front side of the second sheet is displayed as a summary image, as shown in FIG. 13A. When the page is scrolled, the back side of the first sheet (the second page) is displayed as a summary image, and the front side of the second sheet (the third page) is displayed as a detailed image, as shown in FIG. 13B. When the page is scrolled further, the back side of the second sheet (the fourth page) is displayed as a detailed image, and the front side of the third sheet (the fifth page) is displayed as a summary image, as shown in FIG. 13C.

According to the third embodiment, when the double-printing is selected, a two-page spread is displayed as a pair of a detailed image and a summary image within a limited space of the display screen, facilitating the user to imagine how the end result will be. Furthermore, each of the pages is enlarged as a detailed image, so that the user can easily check the contents thereof. In this manner, the user can easily check which side of the original is to be bounded, within the limited space on the display screen.

A fourth embodiment of the present invention is explained with reference to FIGS. 14A to 14C. The same components as in the first embodiment are provided with the same reference numbers, and the explanations thereof are omitted herein. In the first embodiment, only one page is scrolled at a time. On the contrary, in the forth embodiment, two pages are scrolled at a time when the user operates the page-forward and page-back buttons 600.

Figure 14A:
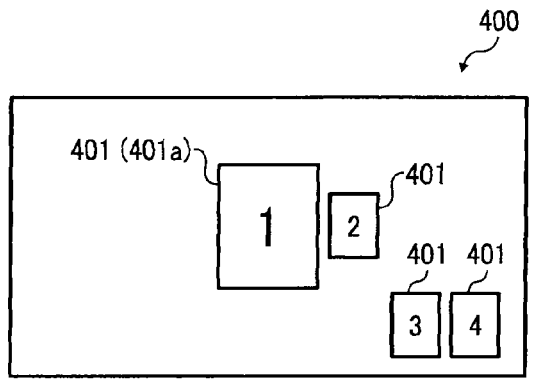
FIGS. 14A to 14C are schematic diagrams for explaining an exemplary preview image scrolling method according to a fourth embodiment of the present invention.
Figure 14B:
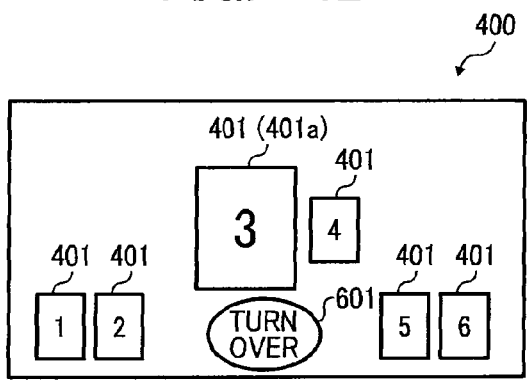
Figure 14C:
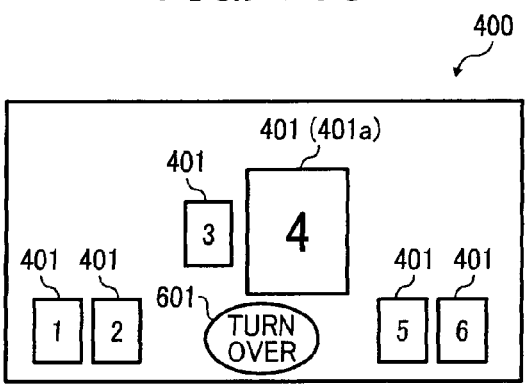

FIGS. 14A to 14C are schematic diagrams for explaining an exemplary preview image scrolling method according to the fourth embodiment. When the user operates the page-forward and page-back buttons 600 and the system controlling unit 16 accepts the page scrolling operation to scroll two pages at a time, then the page displayed in the detailed image 401a is scrolled by a two-page unit, as shown in FIGS. 14A and 14B. In addition, according to the fourth embodiment, a "turn over" button 601 is provided as one of the functions of the page-forward and page-back buttons 600. The "turn over" button 601 allows the user to switch between the detailed image and the summary image paired with the detailed image. When the system controlling unit 16 accepts the operation performed by the "turn over" button 601, the detailed image and the summary image are switched as shown in FIG. 14C. In this manner, a switching unit is realized. The switching unit switches a detailed image to be processed and a summary image paired with the detailed image.

A fifth embodiment of the present invention is explained with reference to FIGS. 15A and 15B. The same components as in the first embodiment are provided with the same reference numbers, and the explanations thereof are omitted herein. In the first embodiment, only one page is scrolled at a time. On the contrary, in the fifth embodiment, two pages are scrolled at a time when the user operates the page-forward and page-back buttons 600.

Figure 15A:
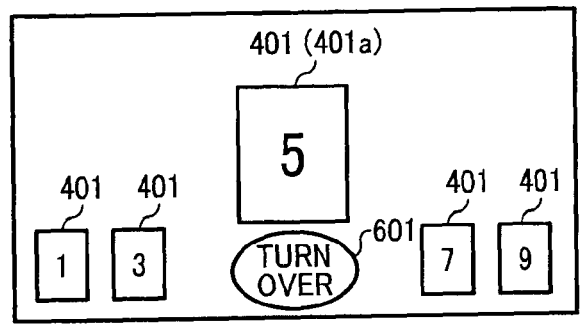
FIGS. 15A and 15B are schematic diagrams for explaining an exemplary preview image scrolling method according to a fifth embodiment of the present invention.
Figure 15B:
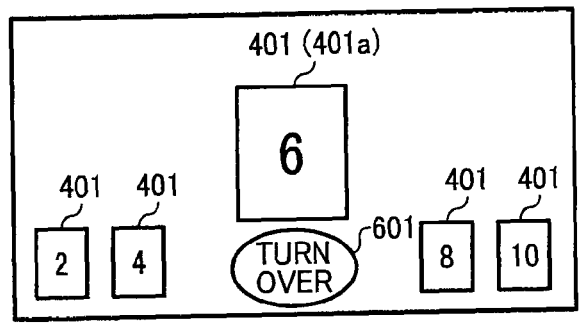

FIGS. 15A and 15B are schematic diagrams for explaining an exemplary preview image scrolling method according to the fifth embodiment. To begin with, only pages of front side images on originals are displayed as the end result information (preview images) 401, including the detailed image 401a, as shown in FIG. 15A. When the user operates the page-forward and page-back buttons 600 and the system controlling unit 16 accepts the page scrolling operation to scroll two pages at a time, the images displayed as the end result information (preview images) 401, including the detailed image 401a, are scrolled for two pages. In addition, according to the fifth embodiment, the "turn over" button 601 is provided as one of the functions of the page-forward and page-back buttons 600. The "turn over" button 601 allows the user to switch between the detailed image and the summary image paired with the detailed image. When the system controlling unit 16 accepts the operation performed by the "turn over" button 601, only pages of back side images on originals are displayed as the end result information (preview images) 401, including the detailed image 401a, as shown in FIG. 15B. In this manner, a replacing unit is realized. The replacing unit replaces a displayed primary preview image to be processed with a secondary preview image paired with the primary image.

A sixth embodiment of the present invention is explained with reference to FIGS. 16 to 20. The same components as in the first to the fifth embodiments are provided with the same reference numbers, and the explanations thereof are omitted herein.

In the first to the fifth embodiments, the MFP 10 is used as the image processing apparatus, however, the image processing apparatus is not limited to an MFP. For example, an image processing apparatus, such as a printer, can be connected to a personal computer (PC), and predetermined computer programs can be installed to a storage device, such as a hard disk drive (HDD), of the PC. A CPU of the PC is operated following the computer programs installed thereto to achieve the same various advantages as those described above.

Figure 16:
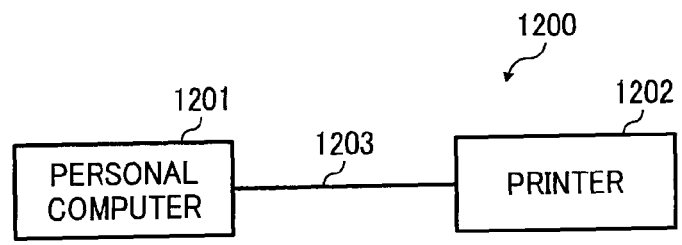
FIG. 16 is a block diagram of a schematic structure of a printing system according to a sixth embodiment of the present invention.

FIG. 16 is a block diagram of a schematic structure of a printing system 1200 according to the sixth embodiment. The printing system 1200 shown in FIG. 16 includes a PC 1201 and a printer 1202 that are connected via a cable 1203. The PC 1201 sends out a print job, including print data and print conditions for printing the print data to the printer 1202. The printer 1202 prints out the print data.

As mentioned above, the PC 1201 sends print data and a print condition data as a print job to the printer 1202. The print data corresponds to a document created in the PC 1201. The print condition data is set for printing out the document, and examples of such conditions include orientation of a printing paper, double-sided printing, multiple-pages-per-sheet printing, binding, stapling, punching, and enlargement/reduction of the image size.

The printer 1202 performs a printing operation based on the print job sent from the PC 1201. Specifically, the printer 1202 prints out the print data, contained in the print job, onto a medium such as a paper, based on the print condition data also contained in the print job.

Figure 17:
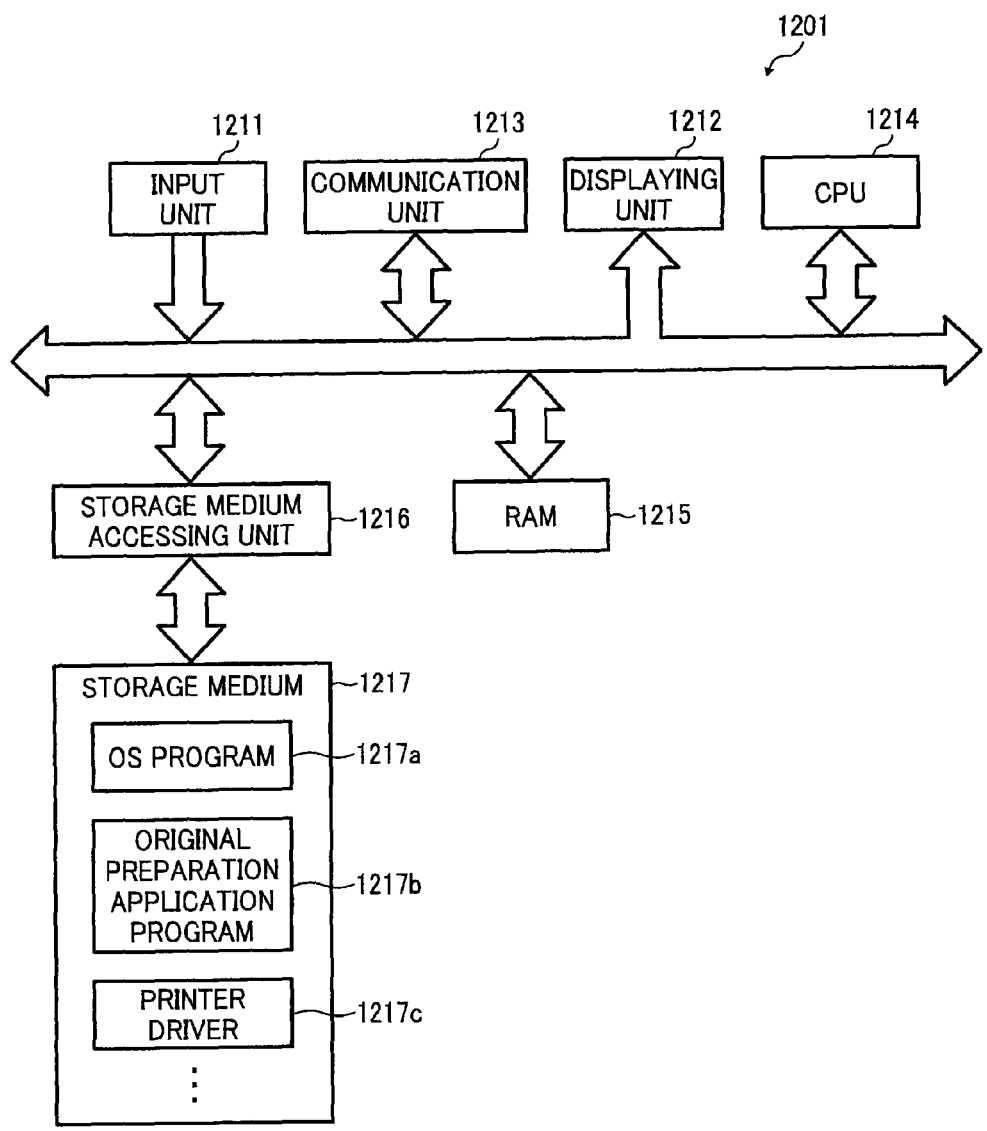
FIG. 17 is a block diagram of a schematic structure of a personal computer shown in FIG. 16.

Specific structures of the PC 1201 and the printer 1202 are explained in the order. FIG. 17 is a block diagram of a schematic structure of the PC 1201. In FIG. 17, the PC 1201 includes: an input unit 1211 for inputting data; a displaying unit 1212; a communication unit 1213 for data communication; a CPU 1214 that controls the entire system; a RAM 1215 that is used as a working area for the CPU 1214; a storage medium accessing unit 1216 that performs read/write operations to a storage medium 1217; and the storage medium 1217 that stores therein various computer programs that causes the CPU 1214 to operate.

The input unit 1211 is a user interface that allows a user to provide the CPU 1214 with instructions for operations, or to input data. The input unit 1211 includes a keyboard including cursor keys, numeric keys, and other various keys, a mouse or a touchpad for selecting the keys or the like on the display screen of the displaying unit 1212, and the like.

The displaying unit 1212 includes a cathode ray tube (CRT) or a liquid crystal display (LCD) and provides the user with a screen that is displayed based on the display data received from the CPU 1214. The communication unit 1213 is provided to exchange data externally, for example, to exchange data with the printer 1202 via the cable 1203.

The CPU 1214 is a central control unit that controls the entire system based on computer programs stored in the storage medium 1217. The CPU 1214 is connected to the input unit 1211, the displaying unit 1212, the communication unit 1213, the RAM 1215, and the storage medium accessing unit 1216. The CPU 1214 controls data communication, read of application programs by accessing a memory, read and write various data, input of data/commands, display, and the like. The CPU 1214 also receives print data and print condition data associated thereto from the input unit 1211, and transfers the print data and the print condition data to the printer 1202 as a print job via the communication unit 1213.

The RAM 1215 includes a working memory and a display memory. The working memory stores therein specified computer programs, input instructions, input data, processed results, or the like. The display memory temporarily stores therein display data to be displayed on the display screen of the displaying unit 1212.

The storage medium 1217 stores therein various computer programs and data. Examples of computer programs stored in the storage medium 1217 include those executable by the CPU 1214, such as an operation system (OS) program 1217a (for example, Windows (registered trademark)), a document preparation application program 1217b, and a printer driver 1217c that is compatible with the printer 1202. The storage medium 1217 includes various optical, magnetic, or electrical storage media, such as a flexible disk, a hard disk, a CD-ROM, a DVD-ROM, a magnetic optical disk (MO), and a PC card. Various computer programs are stored in the storage medium 1217 in a data format readable by the CPU 1214. The various computer programs can be stored in the storage medium in advance, or downloaded over a communication line to be stored in the storage medium. The various computer programs can be also distributed over a communication line.

Figure 18:
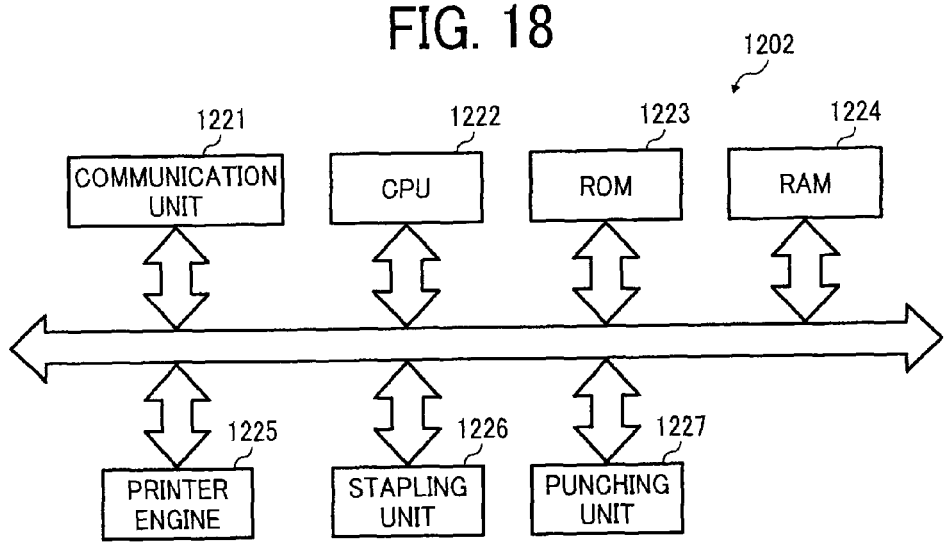
FIG. 18 is a block diagram of a schematic structure of a printer shown in FIG. 16.

FIG. 18 is a block diagram of a schematic structure of the printer 1202. As shown in FIG. 18, the printer 1202 includes: a communication unit 1221 for data communication; a CPU 1222 that controls the entire printer 1202; a ROM 1223 that stores therein various control programs to cause the CPU 1222 to operate; a RAM 1224 that acts as a working area for the various control programs and temporarily stores therein the print data and the print condition data received as a print job from the PC 1201 or the like; a printer engine 1225 for printing the print data onto a printing paper; a stapling unit 1226 for stapling the paper sheets printed with the print data; and a punching unit 1227 for punching holes onto the printing paper(s) printed with the print data. In other words, the printer 1202 includes the double-sided printing function, the punching function, and the stapling function.

The communication unit 1221 performs data communication externally, for example, with the PC 1201.

The CPU 1222 is a central processing unit that controls the entire system based on computer programs stored in the ROM 1223. The CPU 1222 is connected to the communication unit 1221, the ROM 1223, the RAM 1224, the printer engine 1225, the stapling unit 1226, and the punching unit 1227, and controls data communications, operations of the printer, and the like.

The ROM 1223 stores therein various control programs to cause the CPU 1222 to operate, and parameters used for the processes in the control programs. The RAM 1224 includes a working memory that stores therein specified control programs, process results, received print data, and the like.

The printer engine 1225 includes an electrophotographic printer engine, and prints print data onto a printing paper. The printer 1202 can use any printing method in addition to the electrophotographic printing, such as ink-jet printing, sublimation dye thermal transfer, silver halide photographic, direct thermosensitive recording, or thermal wax transfer.

The printer driver 1217c installed in the PC 1201 is explained. The printer driver 1217c is a software program that controls the printer 1202, and performs operations such as processing output data. The printer driver 1217c is designed so that computer programs, with respect to a specific program, can be operated independently from hardware or internal "language" of the printer 1202.

Under the controls of the printer driver 1217c, the CPU 1214 in the PC 1201 generates and displays the end result information (preview image) based on the print data and the print condition data associated thereto input via the input unit 1211. The CPU 1214 then transfers the print data, created with the document preparation application program 1217b, to the printer 1202.

Figure 19:
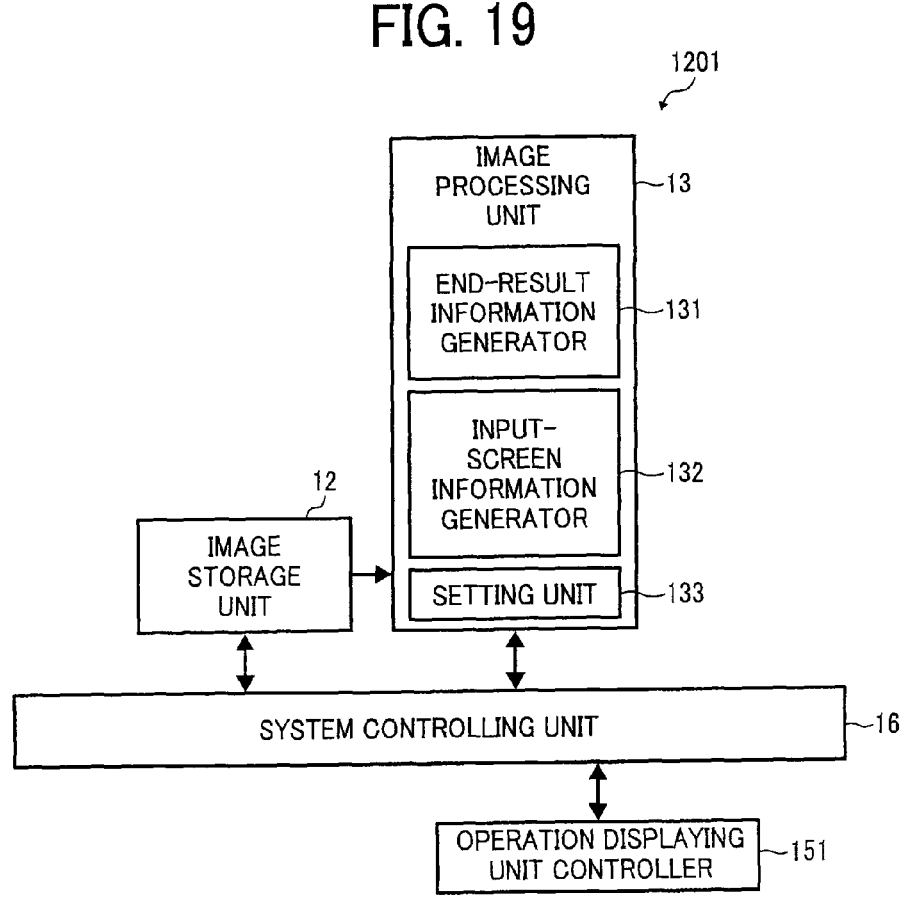
FIG. 19 is a block diagram of a relevant portion of the personal computer shown in FIG. 17.

As shown in FIG. 19, the image storage unit 12, the image processing unit 13, the operation displaying unit controller 151, and the system controlling unit 16 are implemented in the PC 1201, by operating the CPU 1214 under the control of the printer driver 1217c.

In this manner, because the CPU 1214 operates under the control of the printer driver 1217c, the system configuration of the PC 1201 becomes equivalent to that of the MFP 10 shown in FIG. 1. Therefore, those various advantages explained for the first to the fifth embodiments can be also achieved in the third embodiment.

FIG. 20 is a schematic diagram of an exemplary display screen presented by the printer driver 1217c. The screen shown in FIG. 20 is displayed when the printer driver 1217c is started, for example, on the screen of the document preparation application program 1217b or the startup screen of the OS program 1217a. In the screen shown in FIG. 20, the input screen 400 (the same screen as the input screen 400 displayed on the MFP 10) can be selected in addition to a basic condition setting screen, an editing condition setting screen, a finishing condition setting screen, and the like. In the input screen 400, a preview image can be generated and displayed based on the print data and the print condition data associated thereto input via the input unit 1211.

According to the present embodiment, by causing the CPU 1214 in the PC 1201 to operate under the control of the printer driver 1217c, the input screen 400 is displayed. In the input screen 400, the expected end result is generated and displayed based on the print data and the print condition data associated thereto input via the input unit 1211. However, the input screen 400 can also be displayed, without limitation, by causing the CPU 1214 in the PC 1201 to operate under the control of the document preparation application program 1217b or the OS program 1217a.

According to an aspect of the present invention, the user can easily imagine how an end result will be, including pages of the front and back sides of the original, or pages on the two-page spread.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a preview image generating unit that generates preview images by continuously scanning both sides of originals;
a page scrolling unit that scrolls the preview images while pairing a first preview image to be processed according to a predetermined setting with a second preview image that is not processed as pages of any one of front and back sides of an original and a two-page spread; and
a preview displaying unit that displays at least one of the first preview image and the second image,
wherein the preview displaying unit displays the second preview image transparently with respect to the first preview image.

2. The image processing apparatus according to claim 1, further comprising a process setting position changing unit that changes a process setting position on the first preview image for performing a process according to the predetermined setting depending on whether the first preview image is on a front side or a back side of the original when the process setting position changes between the front side and the back side in the process.

3. The image processing apparatus according to claim 2, further comprising a notifying unit that notifies a user of a variation in the process setting position between the front side and the back side.

4. The image processing apparatus according to claim 1, wherein the page scrolling unit scrolls the preview images in units of any one of front and back sides of an original and the two-page spread, while switching the first preview image and the second preview image.

5. The image processing apparatus according to claim 1, further comprising a switching unit that switches the first preview image and the second preview image that is paired with the first preview image.

6. The image processing apparatus according to claim 1, wherein the preview displaying unit displays the first preview image and the second preview image to be arranged adjacent to each other.

7. The image processing apparatus according to claim 6, wherein the preview displaying unit displays the first preview image and the second preview image in a shape like a folding screen.

8. The image processing apparatus according to claim 6, wherein the preview displaying unit displays the first preview image to be larger than the second preview image.

9. The image processing apparatus according to claim 1, wherein the preview displaying unit entirely displays the first preview image, and partially displays the second preview image.

10. The image processing apparatus according to claim 1, wherein the preview displaying unit displays the second preview image as a mirrored image with respect to the first preview image.

11. The image processing apparatus according to claim 1, wherein the preview displaying unit displays only the first preview image.

12. The image processing apparatus according to claim 11, further comprising a replacing unit that replaces the first preview image with the second preview image.

13. The image processing apparatus according to claim 1, wherein the preview displaying unit further displays other preview images on prior and next pages of a pair of the first preview image and the second preview image.

14. The image processing apparatus according to claim. 1, wherein the preview displaying unit displays the second preview image with a symbol image.

15. The image processing apparatus according to claim 1, further comprising a rotation unit that rotates, when a shorter side of a preview image is specified as an axis of the two-page spread, the preview image by 90 degrees with respect to a preview image whose longer side is specified as an axis of the two-page spread.

16. A non-transitory computer-readable medium encoded with a computer program comprising computer readable program codes embodied in the medium that, when executed, causes an image processing apparatus to execute:

generating preview images by continuously scanning both sides of originals;

scrolling the preview images while pairing a first preview image to be processed according to a predetermined setting with a second preview image that is not processed as pages of any one of front and back sides of an original and a two-page spread; and displaying at least one of the first preview image and the second image, wherein the second preview image is displayed transparently with respect to the first preview image.

17. The non-transitory computer-readable medium according to claim 16, wherein said program further causes the image processing apparatus to execute a step of changing a process setting position on the first preview image for performing a process according to the predetermined setting depending on whether the first preview image is on a front side or a back side of the original when the process setting position changes between the front side and the back side in the process.

18. The non-transitory computer-readable medium according to claim 17, wherein said program further causes the image processing apparatus to execute a step of notifying a user of a variation in the process setting position between the front side and the back side.

19. A preview image displaying method comprising:

generating preview images by continuously scanning both sides of originals;

scrolling the preview images while pairing a first preview image to be processed according to a predetermined setting with a second preview image that is not processed as pages of any one of front and back sides of an original and a two-page spread; and displaying at least one of the first preview image and the second image, wherein the second preview image is displayed transparently with respect to the first preview image.

* * * * *